United States Patent
Shigemura

(10) Patent No.: US 10,220,782 B2
(45) Date of Patent: Mar. 5, 2019

(54) IMAGE ANALYSIS APPARATUS AND IMAGE ANALYSIS METHOD

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 167 days.

(21) Appl. No.: 15/116,362

(22) PCT Filed: Jan. 16, 2015

(86) PCT No.: PCT/JP2015/000182
§ 371 (c)(1),
(2) Date: Aug. 3, 2016

(87) PCT Pub. No.: WO2015/118806
PCT Pub. Date: Aug. 13, 2015

(65) Prior Publication Data
US 2016/0347251 A1 Dec. 1, 2016

(30) Foreign Application Priority Data
Feb. 6, 2014 (JP) .................. 2014-021572

(51) Int. Cl.
*G06K 9/00* (2006.01)
*B60R 1/00* (2006.01)
(52) U.S. Cl.
CPC ............ *B60R 1/00* (2013.01); *G06K 9/00805* (2013.01); *B60R 2300/402* (2013.01)

(58) Field of Classification Search
CPC .. B60R 1/00; B60R 2300/402; G06K 9/00805
See application file for complete search history.

(56) References Cited

U.S. PATENT DOCUMENTS

2004/0239526 A1* 12/2004 Nakajima ........ G08G 1/096725
340/905
2010/0102990 A1* 4/2010 Kamioka .................. G01J 1/18
340/942

(Continued)

FOREIGN PATENT DOCUMENTS

JP 2000-182027 A 6/2000
JP 2004-001658 A 1/2004

(Continued)

*Primary Examiner* — Amara Abdi
(74) *Attorney, Agent, or Firm* — Knobbe, Martens, Olson & Bear, LLP

(57) ABSTRACT

An image analysis apparatus is applied to an on-vehicle camera that captures an image of a predetermined monitoring region oriented in a predetermined direction referenced to a vehicle, to analyze an image captured by the on-vehicle camera. The image analysis apparatus includes (i) a storage section that stores a feature quantity of a monitoring region image obtained when an image of the monitoring region is captured by the on-vehicle camera, (ii) an extraction section that acquires an image captured by the on-vehicle camera and extracts a feature quantity of the image captured by the on-vehicle camera, and (iii) a notification section that compares the feature quantity of the image captured by the on-vehicle camera against the feature quantity of the monitoring region image to perform determination whether the on-vehicle camera is mounted in an abnormal position, and notifies a result of the determination.

8 Claims, 10 Drawing Sheets

(56) References Cited

U.S. PATENT DOCUMENTS

2012/0226392 A1\* 9/2012 Kataoka ................ G08G 1/167
                                                                                                          701/1
2014/0051041 A1\* 2/2014 Stefan ................ G09B 19/167
                                                                                                           434/65

FOREIGN PATENT DOCUMENTS

| JP | 2007-008325 | \* | 1/2007 | ............ B60R 1/100 |
| JP | 2007-008325 A | | 1/2007 | |
| JP | 2007-038773 A | | 2/2007 | |
| JP | 2012-175314 A | | 9/2012 | |

\* cited by examiner

FRONT CAMERA IMAGE

BUMPER

FRONT CAMERA IMAGE — PREVIOUSLY

FRONT CAMERA IMAGE — CURRENTLY

UNCHANGED-PIXEL RATIO R
(RATIO OF REGION NOT CHANGED)

FIG. 9A

| VEHICLE SPEED V (km/h) | THRESHOLD RATIO α |
|---|---|
| 0≦V<10 | 50% |
| 10≦V<20 | 45% |
| 20≦V<30 | 45% |
| 30≦V<40 | 35% |
| 40≦V<50 | 30% |
| 50≦V | 25% |

FIG. 9B

| AVERAGE VEHICLE SPEED Va (km/h) | THRESHOLD RATIO β |
|---|---|
| 0≦V<10 | 35 |
| 10≦V<20 | 30 |
| 20≦V<30 | 25 |
| 30≦V<40 | 20 |
| 40≦V<50 | 15 |
| 50≦V | 10 |

IMAGE ANALYSIS APPARATUS AND IMAGE ANALYSIS METHOD

CROSS REFERENCE TO RELATED APPLICATION

The present disclosure is based on Japanese Patent Application No. 2014-21572 filed on Feb. 6, 2014, the disclosure of which is incorporated herein by reference.

TECHNICAL FIELD

The present disclosure relates to an image analysis apparatus and an image analysis method, which detect whether the mounting position or angle of an on-vehicle camera mounted in a vehicle is abnormal.

BACKGROUND ART

Some recently available vehicles are capable of monitoring the area around a vehicle by using an on-vehicle camera. There is known a technology that captures the image of a forward view from the vehicle by using an on-vehicle camera mounted on the front of the vehicle, determines the position of a lane by analyzing the captured image, and detects obstacles and pedestrians. Further, there is a widespread technology that uses an on-vehicle camera mounted on the rear of a vehicle to display the image of a rearward view from the vehicle on a monitor screen during backward movement of the vehicle to provide driving assistance to a driver of the vehicle. Furthermore, there is a proposed technology that uses on-vehicle cameras mounted on the front, rear, left, and right of a vehicle to synthesize images captured by the on-vehicle cameras to display an overhead view of the area around the vehicle (Patent Literature 1).

All the above technologies are developed on the assumption that the on-vehicle cameras capture the image of a predetermined monitoring region. The on-vehicle cameras therefore need to be mounted in an appropriate position and at an appropriate angle. An on-vehicle camera used to monitor the forward or rearward view from the vehicle needs to be mounted at a predetermined angle in both the left-right and front-rear directions with respect to the traveling direction of the vehicle. Further, when an all-around view from the vehicle is to be displayed by using images captured by on-vehicle cameras mounted on the front, rear, left, and right of the vehicle, the on-vehicle cameras need to be mounted at respectively predetermined angles.

PRIOR ART LITERATURES

Patent Literature

Patent Literature 1: JP 2012-175314 A

SUMMARY OF INVENTION

The mounting position or angle (hereinafter simply referred to as a mounting position) of an on-vehicle camera may, however, change without a driver's knowledge due to vibration or external force while the vehicle is under travel or stop.

It is an object of the present disclosure to provide an image analysis apparatus and an image analysis method that are used to detect whether an on-vehicle camera is mounted in an abnormal position.

To achieve the above object, according to an example of the present disclosure, an image analysis apparatus is applied to an on-vehicle camera that captures an image of a predetermined monitoring region oriented in a predetermined direction referenced to a vehicle, to analyze an image captured by the on-vehicle camera. The image analysis apparatus stores a feature quantity of a monitoring region image obtained when an image of the monitoring region is captured by the on-vehicle camera. The apparatus acquires an image captured by the on-vehicle camera and extracts a feature quantity of the image captured by the on-vehicle camera. The apparatus compares the feature quantity of the image captured by the on-vehicle camera against the feature quantity of the monitoring region image to perform determination whether the on-vehicle camera is mounted in an abnormal position, and notifies a result of the determination.

When an on-vehicle camera is mounted normally to capture the image of a monitoring region, an image having a predetermined feature quantity will be captured. The configuration of the above example pre-stores a feature quantity provided by a normally mounted on-vehicle camera and compares the pre-stored feature quantity against the feature quantity of an image actually captured by the on-vehicle camera to determine whether the on-vehicle camera is mounted in an abnormal position. Whether the on-vehicle camera is mounted in an abnormal position is therefore determined with high accuracy without reliance on human visual detection. As another example, the configuration of the above example is also provided as an image analysis method.

BRIEF DESCRIPTION OF DRAWINGS

The above and other objects, features and advantages of the present disclosure will become more apparent from the following detailed description made with reference to the accompanying drawings. In the drawings:

FIG. 9A is a diagram illustrating a threshold value ratio $\alpha$ according to a second modification;

FIG. 9B is a diagram illustrating a threshold value ratio $\beta$ according to the second modification;

EMBODIMENTS FOR CARRYING OUT INVENTION

An image analysis apparatus according to an embodiment of the present disclosure will be described.

First Embodiment

A. Apparatus Configuration

Figure 1:
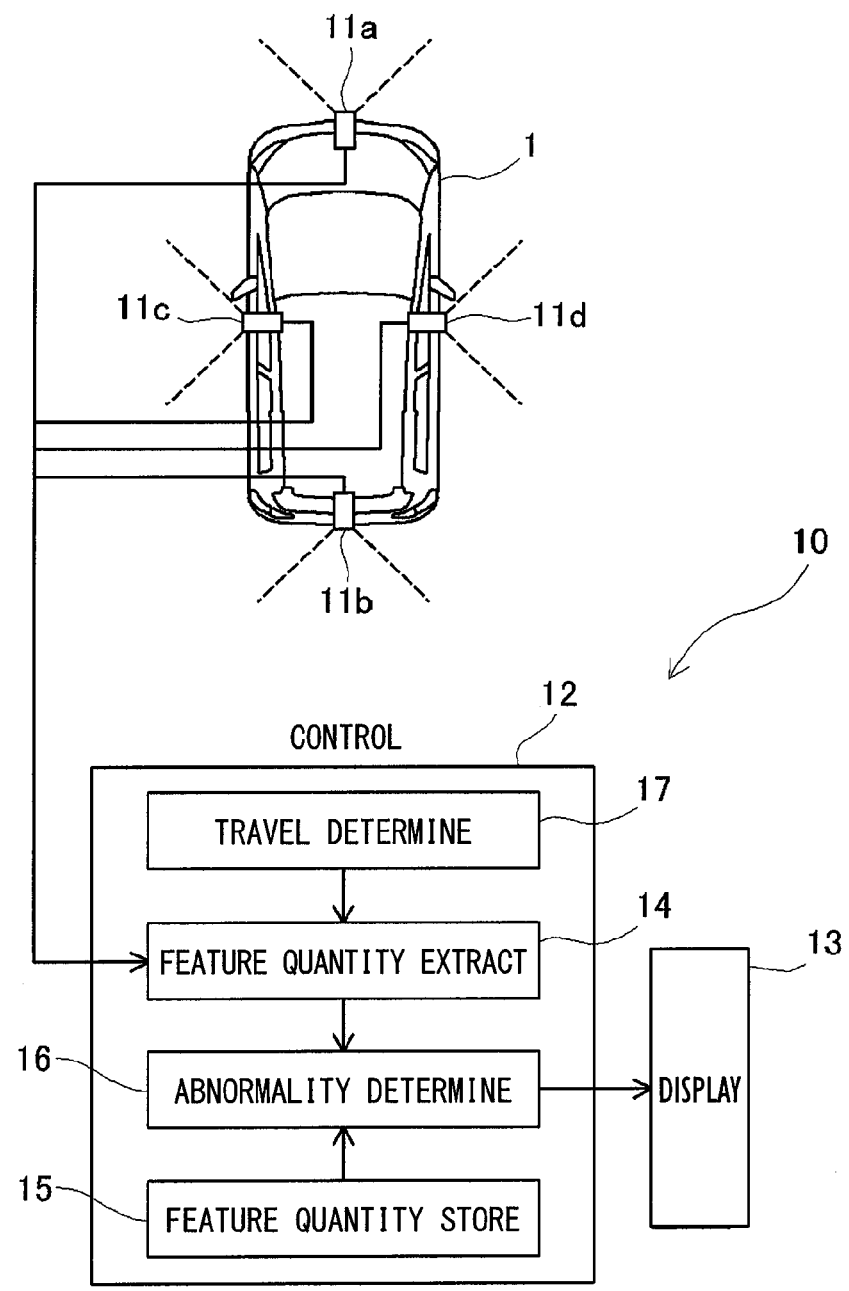
FIG. 1 is a diagram illustrating a configuration of an image analysis apparatus.

FIG. 1 illustrates a configuration of the image analysis apparatus 10 disposed in a vehicle 1 (referred to also as a host vehicle). The image analysis apparatus 10 according to a first embodiment analyzes images captured by on-vehicle cameras 11a-11d (front camera 11a, rear camera 11b, left camera 11c, and right camera 11d), which are mounted on the front, rear, left, and right of the vehicle 1, determines whether the on-vehicle cameras 11a-11d are mounted in respective abnormal positions, and notifies the results of determination. Although details are not given here, the on-vehicle cameras 11a-11d monitor the area around the vehicle 1, and a system separate from the image analysis apparatus 10 detects lane positions, obstacles, and pedestrians based on images captured by the on-vehicle cameras 11a-11d. Therefore, the on-vehicle cameras 11a-11d are mounted in predetermined positions of the vehicle 1 and at predetermined angles (the purpose of adjusting the direction of image capturing) so that the image of a region around the vehicle is captured as needed for the system (this region is referred to as a "monitoring region").

The image analysis apparatus 10 includes a control apparatus 12 and a display unit 13. The control apparatus 12 analyzes images captured by the on-vehicle cameras 11a-11d. The display unit 13 notifies the results of such analyses. The control apparatus 12 includes a circuit board on which a CPU, a memory, and various controllers are mounted, and is disposed behind an instrument panel. As the display unit 13 a liquid-crystal display or a head-up display is installed. The liquid-crystal display is mounted on the instrument panel to orient a display screen toward a driver's seat. The head-up display projects to-be-displayed information onto a windshield.

The control apparatus includes various functional blocks, namely, a feature quantity extraction section 14, a feature quantity storage section 15, an abnormality determination section 16, and a travel determination section 17. The feature quantity extraction section 14 extracts the feature quantity of each of images captured by the on-vehicle cameras 11a-11d (this feature quantity is hereinafter referred to as an "actual feature quantity" because it represents the feature quantity of an actually captured image). The feature quantity storage section 15 pre-stores the feature quantity of an image that is obtained when an image of the "monitoring region" is captured by the on-vehicle cameras 11a-11d, that is, the feature quantity of an image that is obtained when the on-vehicle cameras 11a-11d are mounted in normal positions (this feature quantity is hereinafter referred to as an "ideal feature quantity" because it represents the feature quantity of an ideal image). The abnormality determination section 16 compares the "actual feature quantity" against the "ideal feature quantity" to determine whether the on-vehicle cameras 11a-11d are mounted in abnormal positions. The travel determination section 17 determines based on a vehicle speed sensor mounted in the vehicle 1 whether the vehicle 1 is traveling.

The feature quantity extraction section 14 is referred to also as an extraction section, an extraction device, or a feature quantity extractor. The feature quantity storage section 15 is referred to also as a storage section, a storage device, or a feature quantity storage. The abnormality determination section 16 and the display unit 13 are referred to also as a notification section, a notification device, or a determination result notifier. The travel determination section 17 is referred to also as a travel determination device or a vehicle travel determiner. The actual feature quantity extracted by the feature quantity extraction section 14 is referred to also as a feature quantity of an image captured by an on-vehicle camera. The ideal feature quantity stored in the feature quantity storage section 15 is referred to also as a feature quantity of a monitoring region image.

An image analysis process performed by the image analysis apparatus 10 will be described. The image analysis process is performed to analyze images captured by the on-vehicle cameras 11a-11d to determine whether the on-vehicle cameras 11a-11d are mounted in abnormal positions, and notify the results of determination to the display unit 13.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device or a specific name with a structural modifier. For instance, a section to extract a feature quantity may be referred to as an extraction section, an extraction device, or a feature quantity extractor. Each or any combination of sections explained in the above can be achieved as (i) a software section in combination with a hardware unit (e.g., computer) or (ii) a hardware section (e.g., integrated circuit, hard-wired logic circuit), including or not including a function of a related apparatus; furthermore, the hardware section may be constructed inside of a microcomputer.

B. Image Analysis Process

Figure 2:
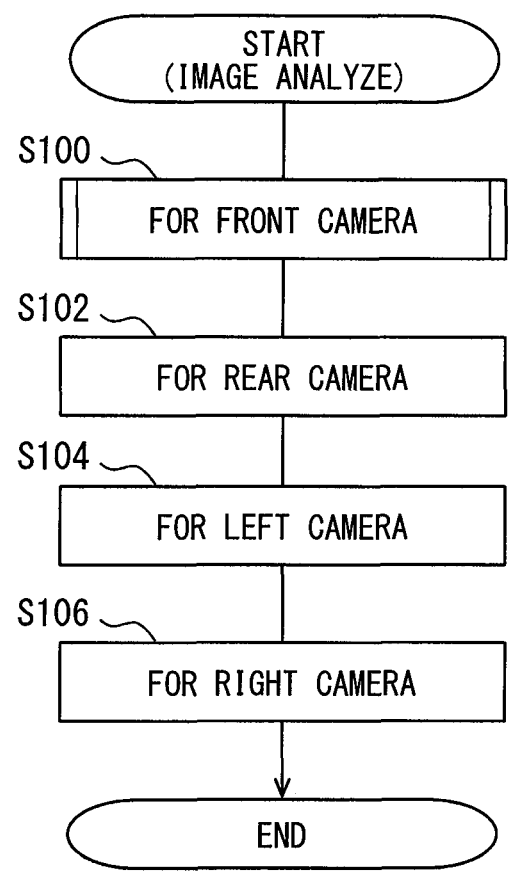
FIG. 2 is a flowchart illustrating an image analysis process performed by a control apparatus.

FIG. 2 is a flowchart illustrating the image analysis process that is performed by the image analysis apparatus 10 according to the present embodiment. The image analysis process is performed by allowing the CPU in the control apparatus 12 to execute a program stored in a ROM. However, the following description will be given on the assumption that the image analysis process is performed by the control apparatus 12 or the aforementioned functional blocks 14-17. The image analysis process is performed at the start of an engine of the vehicle 1 and at predetermined intervals (for example, at 10-second intervals).

As in FIG. 2, the image analysis process performed by the control apparatus 12 includes a front camera process (S100), a rear camera process (S102), a left camera process (S104), and a right camera process (S106). The front camera process (S100) analyzes an image captured by the front camera 11a (the front camera image). The rear camera process (S102) analyzes an image captured by the rear camera 11b (the rear camera image). The left camera process (S104) analyzes an image captured by the left camera 11c (the left camera image). The right camera process (S106) analyzes an image captured by the right camera 11d (the right camera image). These camera processes S100-S106 merely differ in the on-vehicle camera that captures the image to be analyzed. Therefore, the front camera process S100 will be subsequently described as a representative.

Figure 3:
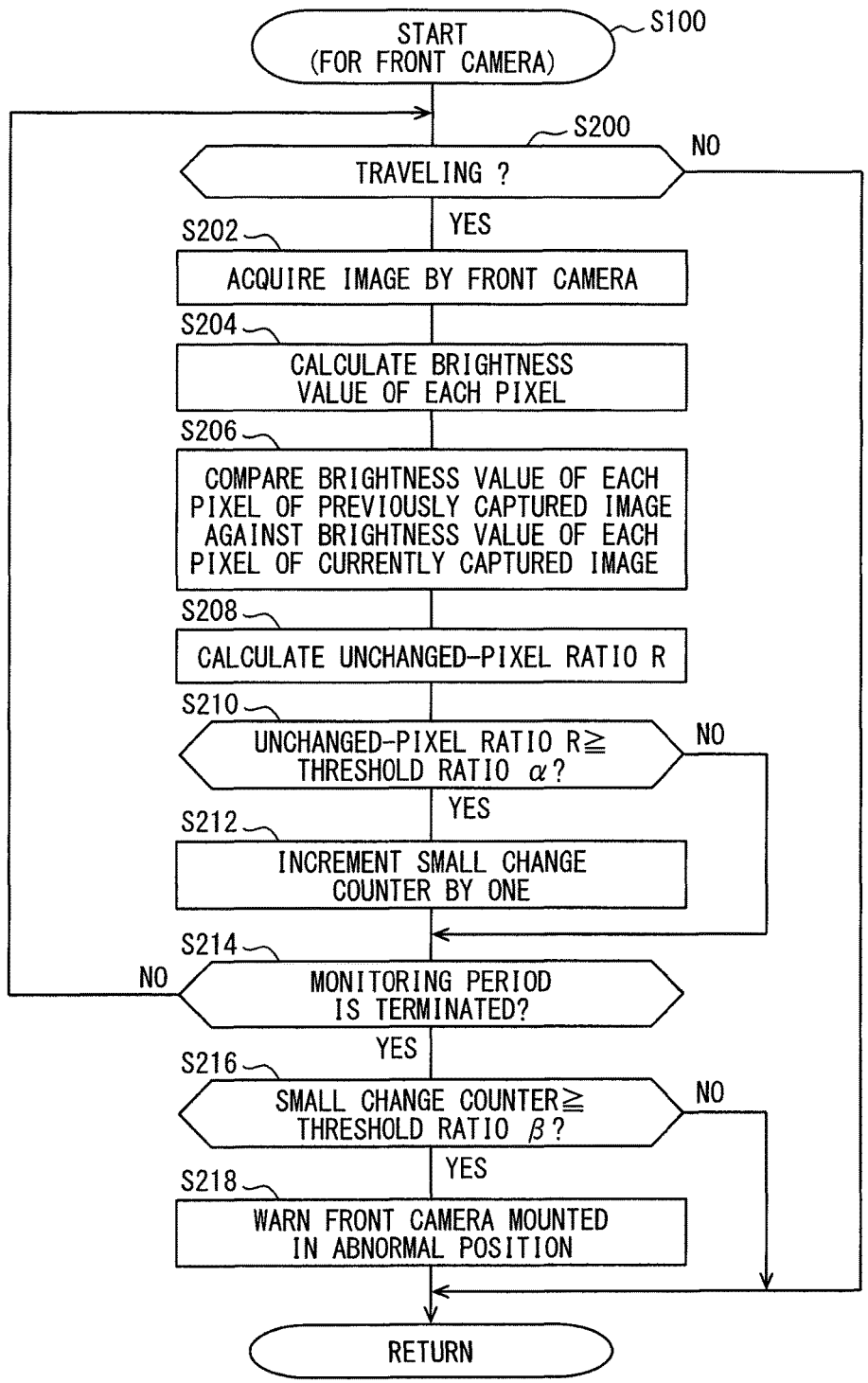
FIG. 3 is a flowchart illustrating a front camera process performed by the control apparatus.

FIG. 3 is a flowchart illustrating the front camera process. The front camera process performs processing between S200 and S218 as below to determine whether the front camera 11a is mounted in an abnormal position based on the front camera image captured during a "monitoring period" between (i) a point of time several seconds earlier (3 seconds earlier in the present embodiment) and (ii) the present.

When the front camera process starts, the travel determination section 17 of the control apparatus 12 determines whether the vehicle 1 is traveling (S200). This determination is performed by checking whether the vehicle speed of the vehicle 1, which is detected by the vehicle speed sensor, is 0 km/h. If the obtained result indicates that the vehicle 1 is not traveling (S200: NO), the front camera process in FIG. 3 comes to an immediate end (without analyzing the image captured by the front camera 11a), and processing returns to the image analysis process in FIG. 2.

By contrast, if the vehicle 1 is determined to be traveling (S200: YES), the control apparatus 12 transmits an image capture command signal to the front camera 11a to let the front camera 11a capture an image, and acquires the captured image (front camera image) (S202). The feature quantity extraction section 14 of the control apparatus 12 then calculates the brightness value of each pixel from the acquired front camera image (S204).

Figure 4:
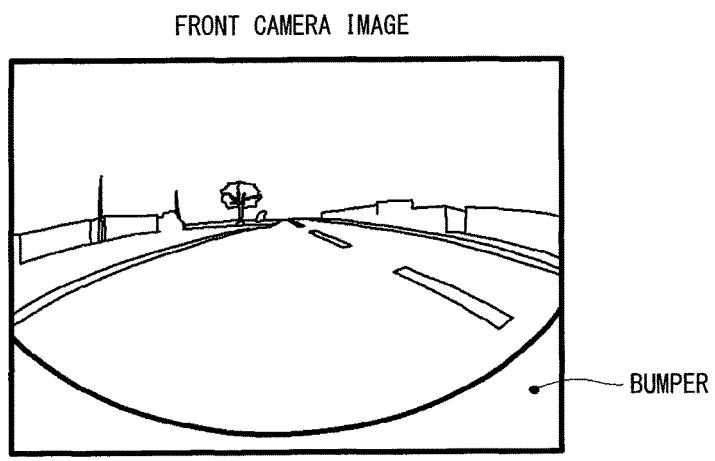
FIG. 4 is a diagram illustrating a front camera image.

FIG. 4 illustrates an example of an image captured by the front camera 11a (front camera image). The front camera 11a is mounted so that a part of a bumper of the vehicle 1 is shown in a lower region of the front camera image while the image of a forward view from the vehicle 1 (an image indicative of road conditions) is shown in the other region (a predetermined region in front of the vehicle 1 serves as a monitoring region). The bumper shown in the front camera image in FIG. 4 is distorted due to lens distortion.

In S204, the brightness value of each pixel of the front camera image is calculated. After brightness value calculation, the calculated brightness value of each pixel is compared against the brightness value of each pixel of the previously captured front camera image. Here, the image analysis apparatus 10 repeatedly performs processing between S200 and S204 during the front camera process in FIG. 3 (during the monitoring period). In S206, therefore, the brightness value of each pixel of the previously captured front camera image (the previous frame) is read and compared against the brightness value of each pixel of the currently captured front camera image (the current frame). If the front camera image is acquired for the first time after the start of the front camera process, S206 is skipped because the previously captured front camera image is not acquired.

Figure 5:
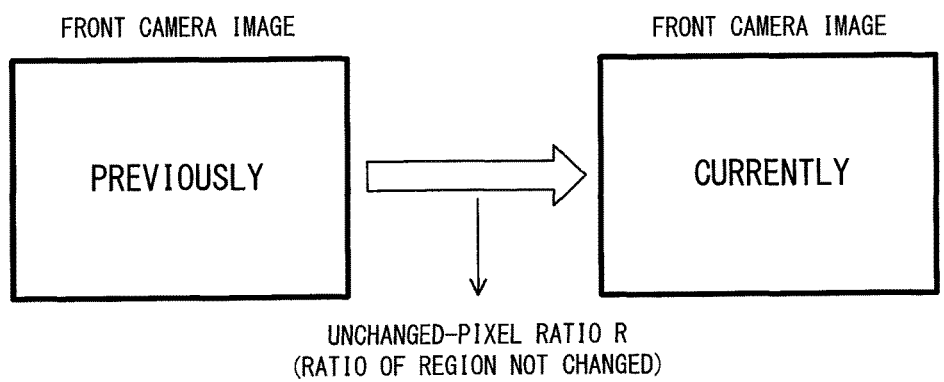
FIG. 5 is a conceptual diagram illustrating brightness value changes in a front camera image.

The brightness value of the "previously captured front camera image" and the brightness value of the "currently captured front camera image" are compared on an individual pixel basis as above (S208) to determine the amount of change in the brightness value from the "previously captured front camera image" and extract pixels whose brightness value change is not greater than a threshold change amount th (for example ±5%). Next, the ratio of the number of extracted pixels to the total number of pixels of the front camera image, that is, the ratio of the "number of pixels whose brightness value change is not greater than the threshold change amount th" (unchanged-pixel ratio R) is calculated (S206). Namely, processing in S208 is performed as in FIG. 5 to calculate the ratio of a region not changed from the "previously captured front camera image" (or a region insignificantly changed; this region is referred to in this document as an "unchanged region") to the region of the "currently captured front camera image".

After the ratio of the unchanged region of the "currently captured front camera image" (unchanged-pixel ratio R) is calculated as above (S208), the abnormality determination section 16 of the control apparatus 12 determines whether the unchanged-pixel ratio R is equal to or greater than a threshold ratio α (for example, equal to 30%) (S210). Namely, S210 is performed to determine whether the amount of change in the brightness value of the "currently captured front camera image" (hereinafter referred to as an "amount of change in the brightness value of the front camera image") is smaller than a predetermined amount (first predetermined amount).

If the result of determination in S210 indicates that the ratio of the unchanged region of the "currently captured front camera image" is equal to or greater than the threshold ratio α, that is, if the amount of change in the brightness value of the front camera image is determined to be smaller than the first predetermined amount (S210: YES), a small change counter is incremented by one (S212). The small change counter counts the number of times the amount of change in the brightness value of the front camera image is determined to be smaller than the first predetermined amount during the monitoring period (i.e., the small change counter counts the number of frames showing a small amount of change in the brightness value during the monitoring period). Therefore, in response to the determination that the amount of change in the brightness value of the front camera image is smaller than the first predetermined value, the small change counter is incremented by one to increase the above-mentioned number of times. By contrast, if the amount of change in the brightness value of the front camera image is not determined to be smaller than the first predetermined amount (S210: NO), S212 is skipped.

Next, a check is performed to determine whether the monitoring period is terminated (S214). As described earlier, the front camera process in FIG. 3 is performed to determine based on the front camera image captured during the monitoring period whether the front camera 11a is mounted in an abnormal position. Processing between S200 and S212 is therefore repeatedly performed if the monitoring period is not terminated (S214: NO). Namely, before the monitoring period is terminated, the front camera image is repeatedly captured (the front camera image is captured a multiple number of times), a check is performed upon each capture of the front camera image to determine whether the amount of change in the brightness value of the front camera image is smaller than the first predetermined amount, and the number of times the amount of change in the brightness value of the front camera image is determined to be smaller than the first predetermined amount (the number of frames showing a small amount of change in the brightness value during the monitoring period) is counted.

If the monitoring period is terminated (S214: YES) while processing between S200 and S212 is repeatedly performed, the abnormality determination section 16 of the control apparatus 12 determines whether the value of the small change counter, that is, the number of times the amount of change in the brightness value of the front camera image is determined to be smaller than the first predetermined amount during the monitoring period (the number of frames showing a small amount of change in the brightness value during the monitoring period) is equal to or greater than a threshold count β (for example, equal to 25) (S216). Namely, S216 is performed to determine whether the "amount of change in the brightness value of the front camera image during the monitoring period" is smaller than a predetermined amount (second predetermined amount). If the "amount of change in the brightness value of the front camera image during the monitoring period" is smaller than the second predetermined amount (S216: YES), the front camera 11a is determined to be mounted in an abnormal position (in an abnormal mounting manner or at an abnormal mounting angle). The reason why the above determination is made is described below.

Figure 6:
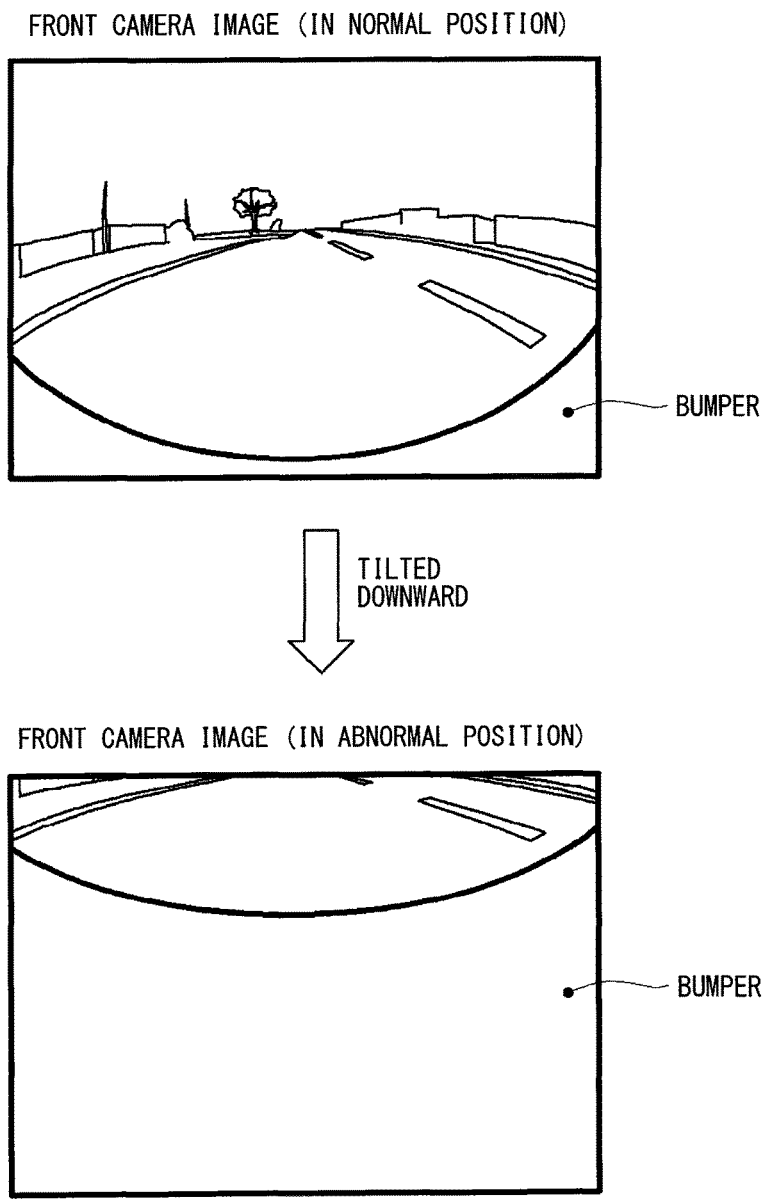
FIG. 6 is a diagram illustrating a front camera image captured by a front camera mounted in a normal position and a front camera image captured by a front camera mounted in an abnormal position.

FIG. 6 illustrates a front camera image obtained when the front camera 11a is mounted in a normal position (the image of the monitoring region is captured) and a front camera image obtained when the front camera 11a is mounted in an abnormal position (the image of a region displaced from the monitoring region is captured). The front camera 11a might be mounted in an abnormal position when the front camera 11a is tilted downward due to vibration during traveling. As in FIG. 6, a region of the front camera image that shows the bumper is increased to decrease a region that shows a scene forward of the vehicle 1 (for example, road conditions). A region of the front camera image that shows the scene forward of the vehicle 1 changes in brightness during traveling. However, the brightness value of a region showing the bumper does not significantly change because the bumper is continuously shown even if the conditions around the vehicle 1 change. The amount of change in the overall brightness value of the front camera image therefore decreases, if the front camera 11a is mounted in an abnormal position to increase the region showing the bumper (the region where the brightness value does not significantly change).

Figure 7:
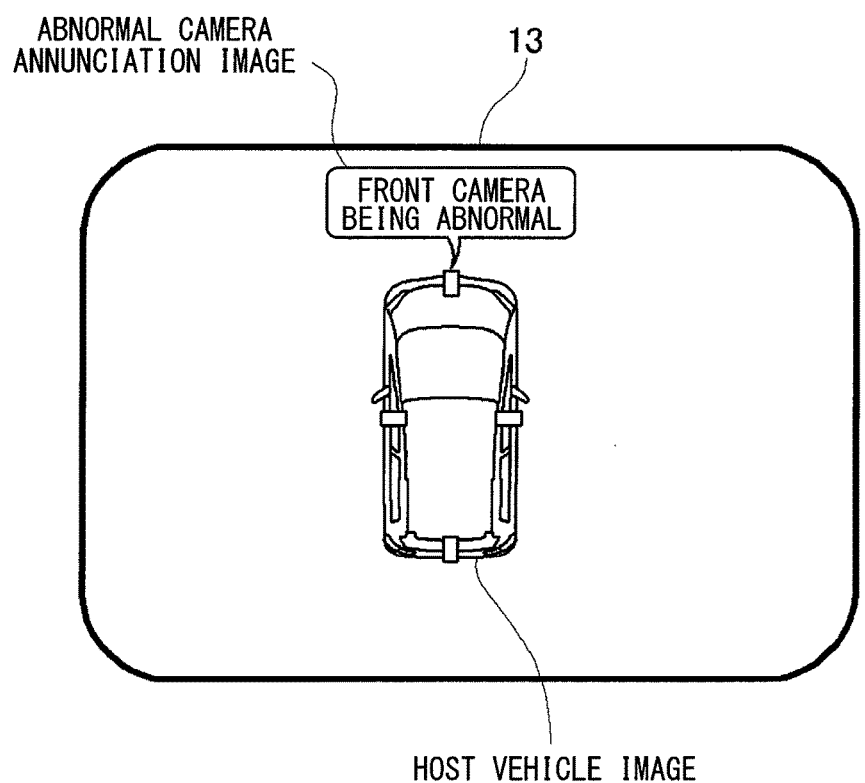
FIG. 7 is a diagram illustrating an abnormality warning image.

If the "amount of change in the brightness value of the front camera image during the monitoring period" is determined in S216 of FIG. 3 to be smaller than the second predetermined amount (S216: YES) although the vehicle 1 is traveling, the mounting position of the front camera 11a is determined to be abnormal (the region of the front camera image that shows the bumper is determined to be large). The display unit 13 then displays an abnormality warning image indicative of the result of determination (S218). FIG. 7 illustrates the abnormality warning image that appears on the display unit 13. The displayed abnormality warning image includes a host vehicle image, which shows the locations of the on-vehicle cameras 11a-11d, and an abnormal camera annunciation image, which indicates an on-vehicle camera mounted in an abnormal position.

By contrast, if the "amount of change in the brightness value of the front camera image during the monitoring period" is determined in S216 to be equal to or greater than the second predetermined amount (S216: NO), the mounting position of the front camera 11a is determined to be normal. S218 is therefore skipped.

The "amount of change the brightness value of the currently captured front camera image (unchanged-pixel ratio R)" and the "amount of change in the brightness value of the front camera image during the monitoring period (the number of times the amount of change in the brightness value of the front camera image is determined to be smaller than the first predetermined amount during the monitoring period)" represent the "actual feature quantity (the amount of change in the brightness value among a plurality of images captured by an on-vehicle camera)" that is to be extracted from the front camera image by the feature quantity extraction section 14. Further, the first predetermined amount and the second predetermined amount (threshold ratio α and threshold count β) represent the "ideal feature quantity (the amount of change in the brightness value of the monitoring region image)" pre-stored in the feature quantity storage section 15. Incidentally, the "ideal feature quantity (the amount of change in the brightness value of the monitoring region image)" is stored prior to factory shipment or when camera position adjustments are made at a vehicle dealer.

Upon completion of processing between S200 and S218, the front camera process in FIG. 3 terminates; processing returns to the image analysis method in FIG. 2. The rear camera 11b, the left camera 11c, and the right camera 11d are also subjected to the same process as indicated between S200 and S218 (S102-S106). As a matter of course, the above process (the process of determining based on camera images captured during the monitoring period whether the on-vehicle cameras 11a-11d are mounted in abnormal positions) is performed each time the image analysis process in FIG. 2 is started.

A front camera image having a predetermined ideal feature quantity may be captured when the front camera 11a is mounted normally to capture an image of the monitoring region as described earlier. When the image analysis apparatus 10 is used, it is estimated that the number of times the ratio of an unchanged region of the "currently captured front camera image" is determined to be equal to or greater than the threshold ratio α is smaller than the threshold count β; namely, it is estimated that the number of times the amount of change in the brightness value of the currently captured front camera image is determined to be smaller than the first predetermined amount is smaller than the threshold count β. In other words, it is estimated that the "amount of change in the brightness value of the front camera image during the monitoring period" is equal to or greater than the second predetermined amount. In this respect, the image analysis apparatus 10 pre-stores the ideal feature quantity (threshold ratio α, threshold count β, first predetermined amount, and second predetermined amount) obtained when the front camera 11a is mounted normally. Further, if the number of times the ratio of a region where the brightness value of the "currently captured front camera image" remains unchanged during the monitoring period is determined to be equal to or greater than the threshold ratio α (the number of times the amount of change in the brightness value of the currently captured front camera image is determined to be smaller than the first predetermined amount) is equal to or greater than the threshold count β, that is, if the "amount of change in the brightness value of the front camera image during the monitoring period" is smaller than the second predetermined amount, the image analysis apparatus 10 according to the present embodiment determines that the front camera 11a is mounted in an abnormal position. Consequently, whether the front camera 11a is mounted in an abnormal position is determined with high accuracy without reliance on human visual detection. The above effect can also be achieved for the rear camera 11b, the left camera 11c, and the right camera 11d.

If the vehicle 1 is traveling, the conditions around the vehicle 1 are likely to change. The amount of change in the brightness value of the front camera image is therefore likely to greatly vary depending on whether the front camera 11a is mounted in a normal position or in an abnormal position. In this respect, the image analysis apparatus 10 checks for abnormality in the mounting position of the front camera 11a by using the front camera image (the front camera image obtained during traveling) whose brightness value change amount tends to greatly vary depending on whether the front camera 11a is mounted in a normal position or in an abnormal position. Whether the front camera 11a is mounted in an abnormal position is thus determined with even higher accuracy.

If the number of times the ratio of the region where the brightness value of the "currently captured front camera image" remains unchanged during the monitoring period is determined to be equal to or greater than the threshold ratio $\alpha$ is equal to or greater than the threshold count $\beta$, the above embodiment determines that the front camera 11a is mounted in an abnormal position. However, if the ratio between a region where the brightness value of the "currently captured front camera image" remains unchanged (the ratio of a region where the amount of change in the brightness value among a plurality of images captured by an on-vehicle camera is equal to or greater than a predetermined amount and a region where the amount of such change is smaller than the predetermined amount) is determined in S210 to be equal to or greater than the threshold ratio $\alpha$ (the ratio between a region where the amount of change in the brightness value of the monitoring region image is equal to or greater than a predetermined amount and a region where the amount of such change is smaller than the predetermined amount), an alternative is to immediately conclude that the front camera 11a is mounted in an abnormal position without counting the number of times the above determination is made. Even if the above alternative configuration is employed, the aforementioned effect is achieved.

Modifications

Modifications of the image analysis apparatus 10 according to the first embodiment will be described.

C-1. First Modification

The first embodiment calculates the brightness value of each pixel in the entire region of the front camera image (S204 of FIG. 3) and compares the "currently captured front camera image" against the "previously captured front camera image" on an individual pixel basis (S206). Meanwhile, a first modification calculates the brightness value of a pixel in a region (particular region) where the brightness value is likely to change when the front camera 11a is mounted in a normal position, and then compares the "currently captured front camera image" against the "previously captured front camera image". That is, the first modification does not perform a process of calculating the brightness value or a process of comparing the "currently captured front camera image" against the "previously captured front camera image" on a region that is unlikely to change even when the front camera 11a is mounted in a normal position.

Figure 8A:
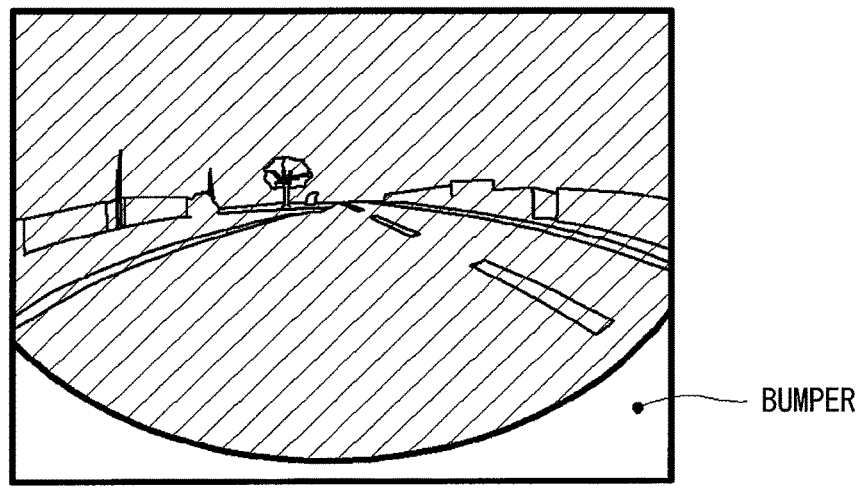
FIG. 8A is a diagram illustrating a process performed according to a first modification.

A hatched portion in FIG. 8A represents a region of the front camera image that shows a scene forward of the vehicle 1 when the front camera 11a is mounted in a normal position (when an image of the monitoring region is captured). As a matter of course, the hatched portion represents a region where the brightness value is likely to change based on the scene forward of the vehicle 1. In contrast, an unhatched portion represents a region where the brightness value is unlikely to change because the bumper is continuously shown even when the scene forward of the vehicle 1 is changed. The first modification calculates the brightness value of such a hatched region where the brightness value is likely to change and compares the "currently captured front camera image" against the "previously captured front camera image".

Figure 8B:
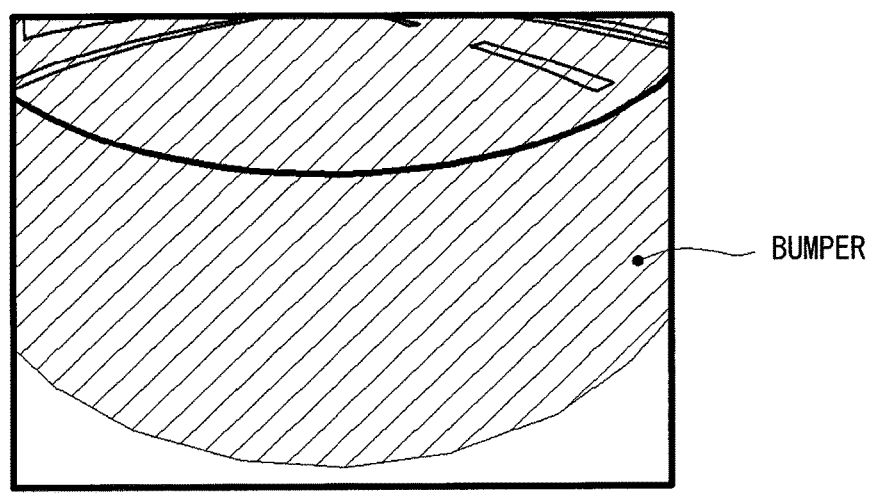
FIG. 8B is a diagram illustrating a process performed according to the first modification.
Figure 10:
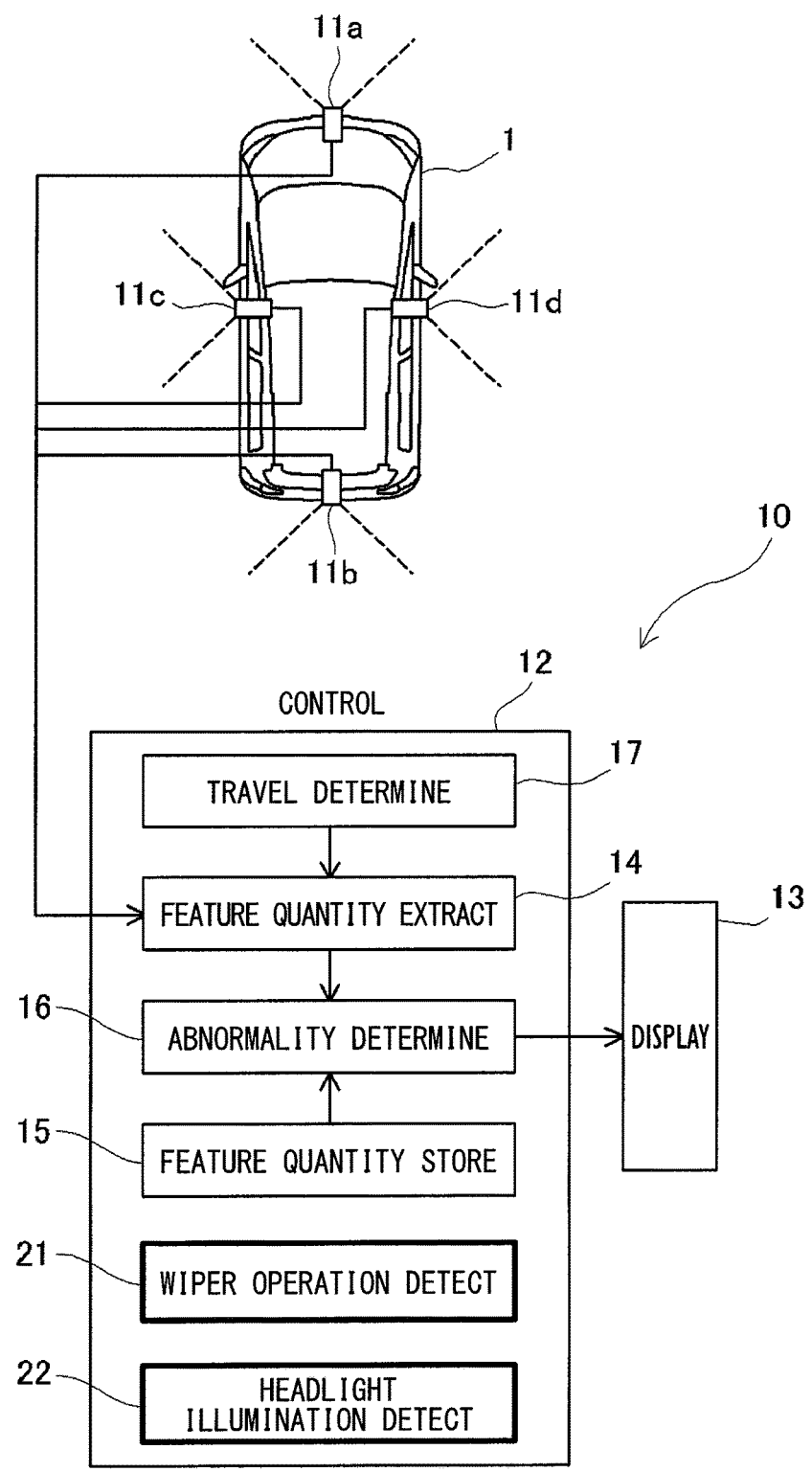
FIG. 10 is a diagram illustrating a configuration of the image analysis apparatus according to a third modification.

If the above process is performed when the front camera is mounted in an abnormal position (oriented downward), the bumper is shown in the hatched region (the region where the "currently captured front camera image" is compared against the "previously captured front camera image") as in FIG. 8B. The brightness value of the hatched region showing the bumper does not significantly change. The amount of change in the brightness value of the hatched region is therefore decreased. When the amount of change in the brightness value of the hatched region is decreased as above, it is determined that the front camera 11a is mounted in an abnormal position.

The first modification calculates the brightness value of each pixel in a region of the front camera image where the brightness value is likely to change and compares the "currently captured front camera image" against the "previously captured front camera image". This enables to reduce the processing load on the image analysis apparatus 10. Further, a region of the front camera image where the brightness value is likely to change is checked to determine whether the front camera 11a is mounted in an abnormal position. This enables to eliminate noise (examining a region where the amount of change remains unchanged no matter whether the mounting position is normal). Consequently, whether the front camera 11a is mounted in an abnormal position is determined with even higher accuracy.

C-2. Second Modification

The first embodiment compares the actual feature quantity (the amount of change in the brightness value of the currently captured front camera image and the amount of change in the brightness value of the front camera image during the monitoring period) against the ideal feature quantity (threshold ratio $\alpha$, threshold count $\beta$, first predetermined amount, and second predetermined amount), which is obtained when the front camera 11a is mounted normally, on the assumption that the ideal feature quantity remains unchanged irrespective of the speed of the vehicle 1. Meanwhile, a second modification determines the ideal feature quantity based on the speed of the vehicle 1 and compares the ideal feature quantity against the actual feature quantity.

As the conditions around the vehicle 1 greatly vary with an increase in the speed of the vehicle 1 no matter whether the mounting position of the front camera 11a remains unchanged, the amount of change in the brightness value of a region of the front camera image that shows the scene forward of the vehicle 1 will increase with an increase in the speed of the vehicle 1. Therefore, when the ideal feature quantity (threshold ratio $\alpha$, threshold count $\beta$, first predetermined amount, and second predetermined amount) remains unchanged irrespective of the speed of the vehicle 1, an increase in the speed of the vehicle 1 causes the actual feature quantity to be more likely to agree with the ideal feature quantity. This increases the possibility of the front camera 11a being determined to be mounted in a normal position.

Since the amount of change in the brightness value of the front camera image increases with an increase in the speed of the vehicle 1 when the front camera 11a is mounted normally, the second modification more strictly sets threshold values (ideal feature quantity, that is, the threshold ratio $\alpha$, threshold count $\beta$, first predetermined amount, and second predetermined amount) for determining that the front camera 11a is abnormal when the speed of the vehicle 1 increases (sets relatively small values for the threshold ratio $\alpha$ and threshold count $\beta$ and relatively great values for the first and second predetermined amounts).

As in FIG. 9A, setup is performed so that the value of the threshold ratio α decreases with an increase in the speed of the vehicle 1. Further, as in FIG. 9B, setup is performed so that the value of the threshold count B decreases with an increase in the average speed of the vehicle 1 during the monitoring period.

Whether the front camera 11a is mounted in an abnormal position is determined while suppressing the influence of the speed of the vehicle 1. Whether the front camera 11a is mounted in an abnormal position is thus determined with even higher accuracy.

C-3. Third Modification

A third modification does not perform the image analysis process in a rainy or foggy weather or during traveling through a tunnel. In a rainy weather, the front camera image shows sticky water droplets to decrease the amount of change in the brightness value of the front camera image even when the front camera 11a is mounted in a normal position. The mounting position of the front camera 11a may be determined to be abnormal. Similarly, in a foggy weather, the scene forward of the vehicle 1 is obscured by fog to decrease the amount of change in the brightness value of the front camera image. The mounting position of the front camera 11a may be determined to be abnormal. Additionally, when the vehicle 1 is traveling through a tunnel, the darkness of the inside of the tunnel decreases the amount of change in the brightness value of the front camera image. The mounting position of the front camera 11a may be determined to be abnormal.

The control apparatus 12 according to the third modification includes a windshield wiper operation detection section 21 and a headlight illumination detection section 22, as indicated by a thick outline. The windshield wiper operation detection section 21 detects the operation of windshield wipers. The headlight illumination detection section 22 detects the illumination of headlights. Before the image analysis process described with reference to FIG. 2 is initiated, the windshield wiper operation detection section 21 detects whether the windshield wipers are operating. As the windshield wipers normally operate in a rainy weather, whether the weather is rainy is determined by detecting whether the windshield wipers are operating. Further, the headlight illumination detection section 22 detects whether the headlights are illuminated. As the headlights are normally illuminated in a foggy weather or during traveling through a tunnel, whether the weather is foggy or the vehicle 1 is traveling through a tunnel is determined by detecting whether the headlights are illuminated. Thus, if the windshield wipers are not operating and the headlights are not illuminated, that is, if the weather is neither rainy nor foggy and the vehicle 1 is not traveling through a tunnel, the image analysis process described with reference to FIG. 2 is performed.

When the weather is rainy or foggy or when the vehicle 1 is traveling through a tunnel, the third modification prevents the mounting position of the front camera 11a from being erroneously determined to be abnormal while the front camera 11a is mounted in a normal position. Whether the front camera 11a is mounted in an abnormal position is therefore determined with even higher accuracy.

The windshield wiper operation detection section 21 is referred to also as a windshield wiper operation detection device or a windshield wiper operation detector. The headlight illumination detection section 22 is referred to also as a headlight illumination detection device or a headlight illumination detector.

C-4. Fourth Modification

In a fourth modification, the feature quantity storage section 15 pre-stores, as the "ideal feature quantity", a region that is always shown when the front camera 11a is mounted in a normal position (for example, a region of the bumper in the upper drawing of FIG. 6). Subsequently, the fourth modification performs the following front camera process.

Figure 11:
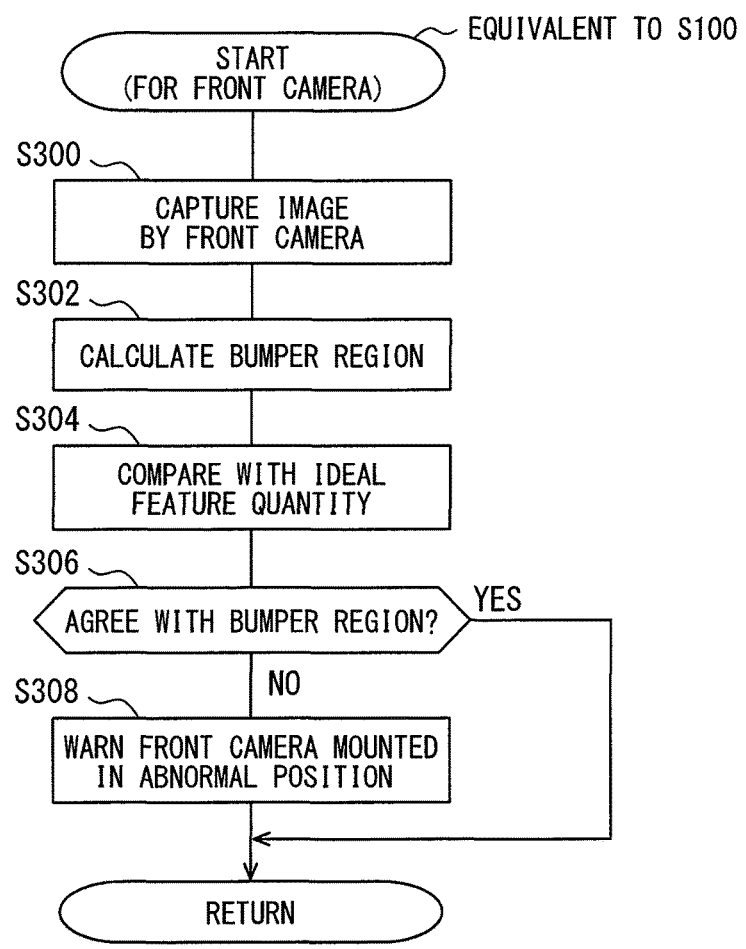
FIG. 11 is a flowchart illustrating the front camera process according to a fourth modification.

FIG. 11 is a flowchart illustrating the front camera process according to the fourth modification. When the front camera process starts, the control apparatus 12 transmits an image capture command signal to the front camera 11a to let the front camera 11a capture an image, and acquires the captured image (front camera image) (S300). The feature quantity extraction section 14 of the control apparatus 12 then calculates the region of the bumper from the acquired front camera image as the "actual feature quantity" (S302). This calculation is performed by using, for example, a well-known edge detection process.

After the region of the bumper is calculated from the front camera image as the actual feature quantity (S302), the abnormality determination section 16 of the control apparatus 12 compares the region of the bumper against the region of the bumper that is pre-stored in the feature quantity storage section 15 as the ideal feature quantity (S304). A check is then performed to determine whether the bumper region calculated as the actual feature quantity agrees with the bumper region pre-stored as the ideal feature quantity (S306). For example, a check is performed to determine whether the area of the bumper region (the number of pixels) calculated as the actual feature quantity is within ±5% of the area of the bumper region (the number of pixels) pre-stored as the ideal feature quantity. An alternative is to determine whether an edge portion of the bumper region calculated as the actual feature quantity (a boundary portion of the front camera image) is within a predetermined distance (for example, within a distance equivalent to 10 pixels) from an edge portion of the bumper region pre-stored as the ideal feature quantity.

If the bumper region calculated as the actual feature quantity agrees with the bumper region pre-stored as the ideal feature quantity (S306: YES), the mounting position of the front camera 11a is determined to be normal, and the front camera process in FIG. 11 comes to an immediate end. By contrast, if the bumper region calculated as the actual feature quantity does not agree with the bumper region pre-stored as the ideal feature quantity (S306: NO), the mounting position of the front camera 11a is determined to be abnormal, and the display unit 13 displays the abnormality warning image (see FIG. 7). The rear camera 11b, the left camera 11c, and the right camera 11d are also subjected to the same process as indicated between S300 and S308.

When there is a region that is always shown when the front camera 11a is mounted in a normal position (a region showing the bumper in the fourth modification), the region should remain unchanged as far as the front camera 11a is mounted in a normal position. The fourth modification thus causes the feature quantity storage section 15 to pre-store, as the "ideal feature quantity", the region that is always shown when the front camera 11a is mounted in a normal position (the region showing the bumper in the fourth modification). If the region showing the bumper does not agree with the region showing the bumper that is calculated from the front camera image, the fourth modification determines that the front camera 11a is mounted in an abnormal position. Even when the vehicle 1 is not traveling, whether the front camera 11a is mounted in an abnormal position is therefore determined with high accuracy without reliance on human visual detection. The above effect is also achieved for the rear camera 11b, the left camera 11c, and the right camera 11d.

The image analysis apparatus according to the first embodiment or its modifications has been described above. However, the present disclosure is not limited to the first embodiment and its modifications. Those skilled in the art will recognize that the present disclosure is implemented by various other embodiments without departing from the spirit and scope of the appended claims.

The first embodiment and its modifications use the brightness value of a pixel as the "actual feature quantity" and the "ideal feature quantity". Alternatively, the RGB values or YUV values of a pixel may be used. Further, the bumper is shown in the front camera image even when the front camera 11a is mounted in a normal position. Alternatively, the bumper may be excluded from the front camera image when the front camera 11a is mounted in a normal position.

When the front camera 11a is mounted in an abnormal position, the first embodiment detects that the amount of change in the brightness value decreases with an increase in the region showing the bumper, and then determines that the front camera 11a is mounted in an abnormal position. However, when the front camera 11a is mounted in an abnormal position, an alternative is to detect that the amount of change in the brightness value decreases with an increase in a region showing a road surface such as an asphalt pavement surface, and then determine that the front camera 11a is mounted in an abnormal position.

Moreover, the fourth modification uses the region showing the bumper as the region that is always shown when the front camera 11a is mounted in a normal position. However, an alternative is to use a region showing a side mirror, a hood, or other part of the vehicle 1.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An image analysis apparatus applied to an on-vehicle camera that captures an image of a predetermined monitoring region oriented in a predetermined direction referenced to a vehicle, to analyze an image captured by the on-vehicle camera, the image analysis apparatus comprising:
a storage section that stores a feature quantity of a monitoring region image obtained when an image of the monitoring region is captured by the on-vehicle camera;
an extraction section that acquires an image captured by the on-vehicle camera and extracts a feature quantity of the image captured by the on-vehicle camera;
a notification section that compares the feature quantity of the image captured by the on-vehicle camera against the feature quantity of the monitoring region image to perform determination whether the on-vehicle camera is mounted in an abnormal position, and notifies a result of the determination; and
a travel determination section that determines whether the vehicle is traveling,
wherein:
the storage section stores, as the feature quantity of the monitoring region image, a ratio between (i) an image region within the monitoring region image where an amount of change in a brightness value of the monitoring region image obtained during traveling of the vehicle is equal to or greater than a predetermined amount and (ii) an image region within the monitoring region image where the amount of the change is smaller than the predetermined amount; and
the extraction section acquires a plurality of images captured a multiple number of times by the on-vehicle camera during traveling of the vehicle and extracts, as the feature quantity of the image captured by the on-vehicle camera, a ratio between (i) an image region within the images where the amount of change in the brightness value between the images is equal to or greater than a predetermined amount and (ii) an image region within the images where the amount of the change is smaller than the predetermined amount.

2. An image analysis apparatus applied to an on-vehicle camera that captures an image of a predetermined monitoring region oriented in a predetermined direction referenced to a vehicle, to analyze an image captured by the on-vehicle camera, the image analysis apparatus comprising:
a storage section that stores a feature quantity of a monitoring region image obtained when an image of the monitoring region is captured by the on-vehicle camera;
an extraction section that acquires an image captured by the on-vehicle camera and extracts a feature quantity of the image captured by the on-vehicle camera;
a notification section that compares the feature quantity of the image captured by the on-vehicle camera against the feature quantity of the monitoring region image to perform determination whether the on-vehicle camera is mounted in an abnormal position, and notifies a result of the determination; and
a windshield wiper operation detection section that detects whether a windshield wiper is operating,
wherein, when the windshield wiper is operating, the notification section refuses to perform the determination whether the on-vehicle camera is mounted in the abnormal position.

3. The image analysis apparatus according to claim 2, further comprising:
a travel determination section that determines whether the vehicle is traveling;
wherein:
the storage section stores an amount of change in a brightness value of the monitoring region image during traveling of the vehicle as the feature quantity of the monitoring region image; and
the extraction section acquires a plurality of images captured a multiple number of times by the on-vehicle camera during the traveling of the vehicle and extracts an amount of change in a brightness value between the images as the feature quantity of the image captured by the on-vehicle camera.

4. The image analysis apparatus according to claim 3, wherein:
the storage section stores the amount of change in the brightness value of a predetermined particular region defined within the monitoring region image as the feature quantity of the monitoring region image; and the extraction section extracts the amount of change in the brightness value of an image of the particular region captured by the on-vehicle camera as the feature quantity of the image captured by the on-vehicle camera.

5. An image analysis apparatus applied to an on-vehicle camera that captures an image of a predetermined monitoring region oriented in a predetermined direction referenced to a vehicle, to analyze an image captured by the on-vehicle camera, the image analysis apparatus comprising:
- a storage section that stores a feature quantity of a monitoring region image obtained when an image of the monitoring region is captured by the on-vehicle camera;
- an extraction section that acquires an image captured by the on-vehicle camera and extracts a feature quantity of the image captured by the on-vehicle camera;
- a notification section that compares the feature quantity of the image captured by the on-vehicle camera against the feature quantity of the monitoring region image to perform determination whether the on-vehicle camera is mounted in an abnormal position, and notifies a result of the determination; and
- a headlight illumination detection section that detects whether a headlight is illuminated,
- wherein, when the headlight is illuminated, the notification section refuses to perform the determination whether the on-vehicle camera is mounted in the abnormal position.

6. The image analysis apparatus according to claim 5, further comprising:
- a travel determination section that determines whether the vehicle is traveling;
wherein:
- the storage section stores an amount of change in a brightness value of the monitoring region image during traveling of the vehicle as the feature quantity of the monitoring region image; and
- the extraction section acquires a plurality of images captured a multiple number of times by the on-vehicle camera during the traveling of the vehicle and extracts an amount of change in a brightness value between the images as the feature quantity of the image captured by the on-vehicle camera.

7. The image analysis apparatus according to claim 6, wherein:
- the storage section stores the amount of change in the brightness value of a predetermined particular region defined within the monitoring region image as the feature quantity of the monitoring region image; and
- the extraction section extracts the amount of change in the brightness value of an image of the particular region captured by the on-vehicle camera as the feature quantity of the image captured by the on-vehicle camera.

8. An image analysis method applied to an on-vehicle camera that captures an image of a predetermined monitoring region oriented in a predetermined direction referenced to a vehicle, to analyze an image captured by the on-vehicle camera, the image analysis method comprising:
- acquiring a plurality of images captured a multiple number of times by the on-vehicle camera during traveling of the vehicle;
- extracting a feature quantity of an image captured by the on-vehicle camera, the feature quantity of the image captured by the on-vehicle camera being a ratio between (i) an image region within the image where an amount of change in a brightness value between the acquired images is equal to or greater than a predetermined amount and (ii) an image region within the image where the amount of the change is smaller than the predetermined amount;
- comparing the feature quantity of the image captured by the on-vehicle camera against a feature quantity of a monitoring region image obtained when an image of the monitoring region is captured by the on-vehicle camera, the feature quantity of the monitoring region image being a ratio between (i) an image region within the monitoring region image where an amount of change in a brightness value of the monitoring region image obtained during traveling of the vehicle is equal to or greater than a predetermined amount and (ii) an image region within the monitoring region image where the amount of the change is smaller than the predetermined amount, to perform determination whether the on-vehicle camera is mounted in an abnormal position; and
- notifying a result of the determination.

* * * * *